United States Patent
Maity (10) Patent No.: US 11,073,471 B2
(45) Date of Patent: Jul. 27, 2021

(54) TAPERED ATTENUATION TOTAL INTERNAL REFLECTION OPTICAL SENSOR FOR DOWNHOLE PRODUCTION LOGGING

(71) Applicant: Sondex Wireline Limited, Farnborough (GB)

(72) Inventor: Sandip Maity, Dhahran (SA)

(73) Assignee: SONDEX WIRELINE LIMITED, Farnborough (GB)

( * ) Notice: Subject to any disclaimer, the term of this patent is extended or adjusted under 35 U.S.C. 154(b) by 0 days.

(21) Appl. No.: 16/514,944

(22) Filed: Jul. 17, 2019

(65) Prior Publication Data
US 2020/0025680 A1 Jan. 23, 2020

Related U.S. Application Data

(60) Provisional application No. 62/701,292, filed on Jul. 20, 2018.

(51) Int. Cl.
*G01N 21/45* (2006.01)
*G01V 8/16* (2006.01)

(52) U.S. Cl.
CPC ............. *G01N 21/45* (2013.01); *G01V 8/16* (2013.01); *G01N 2201/06113* (2013.01)

(58) Field of Classification Search
CPC .. G01N 21/8507; G01N 21/45; G01N 21/552; G01N 21/3577; G01N 21/41; G01N 2021/399; G01N 2021/8405; G01N 2201/06113; E21B 47/00; E21B 23/00; E21B 33/14; G01V 8/16; E01B 49/081; F21B 49/003
See application file for complete search history.

(56) References Cited

U.S. PATENT DOCUMENTS 5,901,261 A * 5/1999 Wach .................. G02B 6/3624
385/116
5,953,477 A * 9/1999 Wach ................. A61B 5/14546
385/115

(Continued)

FOREIGN PATENT DOCUMENTS

EP 3190400 7/2017
WO 2018/005465 1/2018

OTHER PUBLICATIONS

GCC Examination Report dated Sep. 5, 2020 in corresponding GCC Application No. GC 2019-37958 (English translation provided).

*Primary Examiner* — Sang H Nguyen
(74) *Attorney, Agent, or Firm* — Hogan Lovells US LLP (57) ABSTRACT

The present disclosure is for a tool for measurement of phases in fluid in downhole applications. The tool includes a light coupler for providing a first light and for detecting a second light. The first light is provided to an optical interface and the second light is received from the optical interface. The optical interface is between the tool and the fluid. An optical path is provided that is integral or coupled to the optical interface. The optical path allows transmission of the first light into the fluid at the optical interface and also allows receiving the second light from the optical interface. The second light includes one or more light components disturbed by the fluid. A processor provides digital data associated with the measurement of phases in the fluid using optical data from at least the second light.

24 Claims, 9 Drawing Sheets

(56) References Cited

U.S. PATENT DOCUMENTS

| | | | | |
|---|---|---|---|---|
| 6,023,340 | A * | 2/2000 | Wu | G01F 1/661 |
| | | | | 356/432 |
| 6,678,050 | B2 * | 1/2004 | Pope | G01N 21/27 |
| | | | | 356/435 |
| 9,651,710 | B2 * | 5/2017 | Donzier | G01N 21/8507 |
| 2007/0147738 | A1 * | 6/2007 | Wang | G01N 21/45 |
| | | | | 385/43 |
| 2008/0030714 | A1 * | 2/2008 | Hall | G01N 21/552 |
| | | | | 356/72 |
| 2009/0302221 | A1 * | 12/2009 | Tavernier | G01N 21/552 |
| | | | | 250/338.5 |
| 2012/0170023 | A1 * | 7/2012 | Szobota | G01N 21/552 |
| | | | | 356/51 |
| 2012/0290208 | A1 * | 11/2012 | Jiang | G01N 21/552 |
| | | | | 702/8 |
| 2015/0144776 | A1 * | 5/2015 | Jung | E21B 49/087 |
| | | | | 250/269.1 |
| 2016/0231459 | A1 * | 8/2016 | Perkins | G01N 21/85 |
| 2017/0131204 | A1 * | 5/2017 | Sieben | G01N 21/553 |
| 2017/0198574 | A1 * | 7/2017 | Donzier | G01N 21/55 |
| 2017/0219737 | A1 * | 8/2017 | Donzier | E21B 49/08 |
| 2018/0003027 | A1 | 1/2018 | Donzier | |
| 2018/0003035 | A1 * | 1/2018 | Luht | G01N 9/00 |
| 2018/0245451 | A1 * | 8/2018 | Hu | G01V 5/125 |
| 2018/0334904 | A1 * | 11/2018 | Pearl, Jr. | G02B 1/18 |
| 2019/0383130 | A1 * | 12/2019 | Fox | G01V 5/107 |

\* cited by examiner

| | % OF LIGHT INTENSITY COMING BACK TO DETECTOR (0.405 μm) | % OF LIGHT INTENSITY COMING BACK TO DETECTOR (3.0 μm) |
|---|---|---|
| GAS BUBBLE | ~100% | ~100% |
| WATER | ~100% | 0% (DUE TO EVANESCENT FIELD ABS.) |
| OIL | ~60-70% (DUE TO EVANESCENT FIELD ABS.) | ~100% |

FIG. 11A

| | % OF LIGHT INTENSITY COMING BACK TO DETECTOR (0.850 μm) | % OF LIGHT INTENSITY COMING BACK TO DETECTOR (1.5 μm) |
|---|---|---|
| GAS BUBBLE | ~80% (BY TIR) | ~80% (BY TIR) |
| WATER | ~60% (BY TIR) | 10% (DUE TO EVANESCENT FIELD ABS.) |
| OIL | ~10% (BY TIR) | ~10% (BY TIR) |

TAPERED ATTENUATION TOTAL INTERNAL REFLECTION OPTICAL SENSOR FOR DOWNHOLE PRODUCTION LOGGING

RELATED APPLICATION

This application relates to and claims priority from U.S. Provisional Application No. 62/701,292, titled "TUNABLE WAVELENGTH DIFFERENTIAL ABSORPTION ON TAPERED ATTENUATION TOTAL INTERNAL REFLECTION OPTICAL SENSOR FOR THREE PHASE DETECTION FOR DOWNHOLE PRODUCTION LOGGING," filed Jul. 20, 2018, the entirety of which is incorporated by reference herein for all intents and purposes.

BACKGROUND

1. Field of Invention

This invention relates in general to equipment used in the hydrocarbon industry, and in particular, to a tool for measurement of phases in fluid in downhole applications.

2. Description of the Prior Art

A feature in oil and gas production is to maximize economic value from available reservoirs. This enables an operator to make informed decisions on development and production of a based in part on analysis of fluid from downhole environments. In an example, downhole gas-oil-water analysis of oil fields is performed to verify gas/oil ratio (GOR) and/or gas volume fraction (GVF) in the fluid from a downhole environment. The GOR and GVF are important because two-phase metering solutions performed on such fluid do not work in oil fields with a very high GOR and/or GVF. Two-phase metering also does not work reliably in the presence of even a small amount of water, condensate, high salinity components, and/or light oil in the fluid.

Further, existing downhole production logging tool (PLT) suppliers provide three-phase metering from downhole data that can only be interpreted through two-phase measurement. Currently, technology is lacking for logging of three-phase measurements from downhole environments under high GVF and GOR conditions during production. Accordingly, existing downhole PLTs are not suitably configured for in-line retrieval, reliance, and low cost three-phase metering for monitoring field or reservoir performance in real-time. This issue may be aggravated in production when there is a decline in production and when GOR increases in a specific well, for example. Such developments may reflect a loss of control of specific well compartments.

SUMMARY

A tool is disclosed for measurement of phases in fluid in downhole applications. The tool includes at least one light coupler for providing a first light and for detecting a second light. The first light is provided to at least one optical interface and the second light is received from the at least one optical interface that interfaces between the tool and the fluid. At least one optical path is provided integral or coupled to the at least one optical interface. The at least one optical path transmits the first light into the fluid at the at least one optical interface and receives the second light from the at least one optical interface. The second light includes one or more light components of the first light that has been disturbed by the fluid by an action such as absorption of the one or more components to reduce an intensity of the one or more components of the first light. The tool includes at least one processor for providing digital data associated with the measurement of phases in the fluid using optical data from at least the second light.

A method is also disclosed for measurement of phases in fluid in downhole applications. The method includes providing, using at least one light coupler, a first light provided to at least one optical interface. A sub-process of the method includes transmitting the first light into the fluid at the at least one optical interface using at least one optical path integral or coupled to the at least one optical interface. A second light is received as part of the method from the at least one optical interface through the at least one optical path. The second light includes the one or more light components of the first light that has been disturbed by the fluid. The method includes using at least one processor to provide digital data associated with the measurement of phases in the fluid using optical data from the first light and the second light.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various other functions can be implemented within the various embodiments as well as discussed and suggested elsewhere herein.

Figure 1:
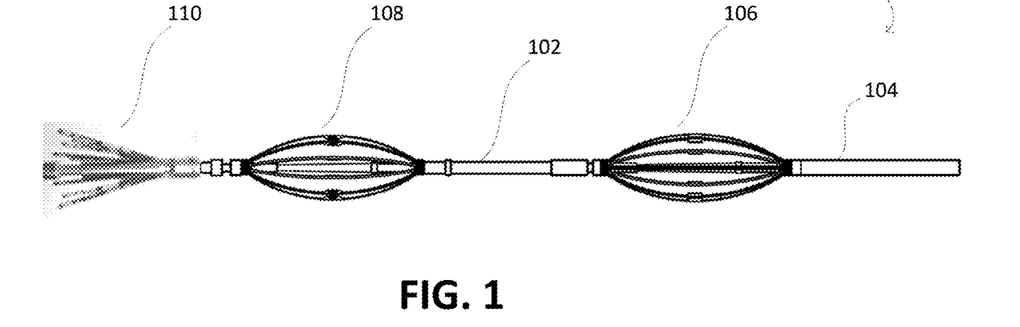
FIG. 1 illustrates an example of a downhole production logging tool (PLT) subject to the improvements disclosed herein, in accordance with various embodiments.

FIG. 1 illustrates an example of a downhole production logging tool (PLT) 100 subject to the improvements disclosed herein, in accordance with various embodiments. The PLT 100 includes a downhole instrument 102 with compartments for a temperature sensor 104, a spinner array 106, a capacitance array 108, and resistance array 110. These components collectively provide capability to detect and monitor phases in a fluid from a downhole application. However, PLT 100 represents a string that is long because of the separate components that makes borehole access difficult. Particularly, the length of the string and the existence of separate components make PLT 100 susceptible to damage. In addition, as multiple compartments exist on the strong, maintenance is complicated when only one compartment is to the addressed, for instance. As such, PLT 100 represents conventional PLTs with exceedingly large features that require space to fit and complicates maneuvering of the downhole instrument 102.

Figure 2:
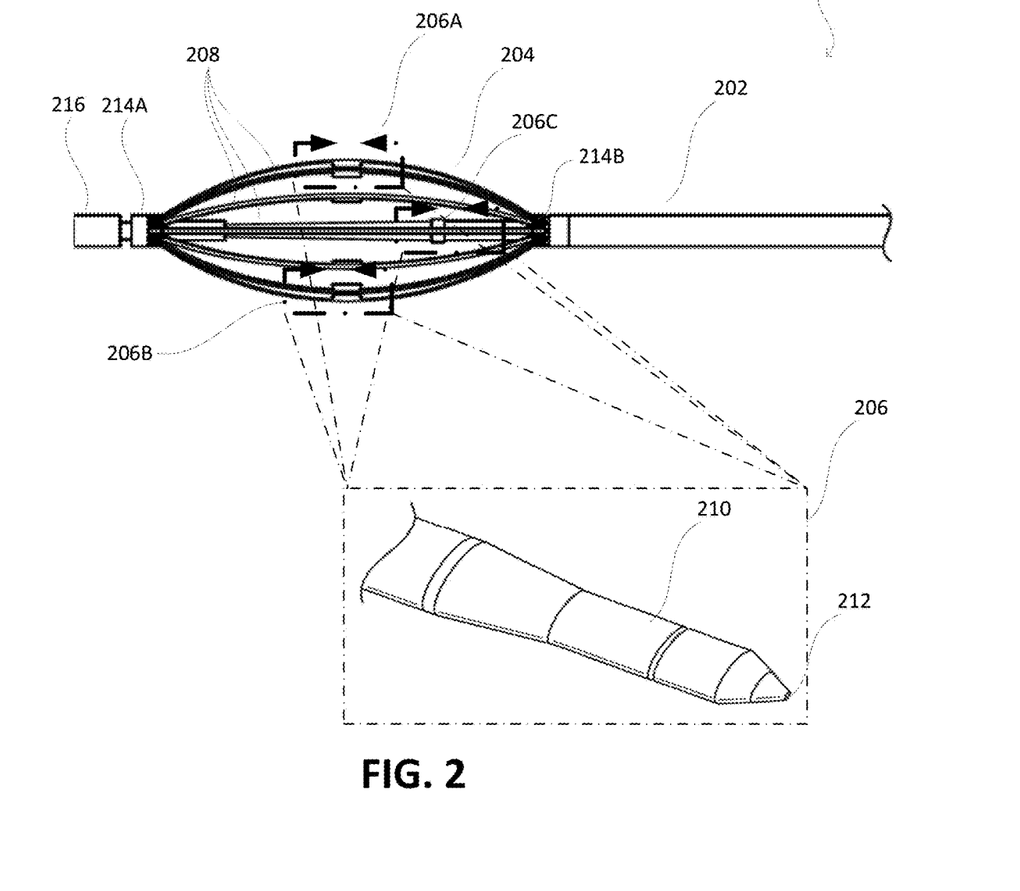
FIG. 2 illustrates an example of a downhole production logging tool (PLT) including sub-tools for detection and measurement of phases in fluid in downhole applications, in accordance with various embodiments.

FIG. 2 illustrates an example of a tool 200 including sub-tools—e.g., 206A-206C—for detection and measurement of phases in fluid in downhole applications, in accordance with various embodiments. Tool 200 may be a Gas-Oil-Water Array Tool (GOWAT) 200 that includes a downhole instrument 202. The downhole instrument 202 includes a pressured housing with a pod 204 having bows 208. Each bow 208 has a sub-tool—e.g., 206A-206C. More sub-tools may be provided on each bow 208. Further, multiple sub-tools may be provided on each bow 208. The number of sub-tools may be an even number to reflect a level of symmetry required for the tool 200 to detect and measure phases in a fluid in a downhole application. For example, other than the pod 204, a velocity sub-tool (also referred to herein as a spinner tool) may be deployed on each bow 208. The velocity sub-tool may be deployed adjacent to each of the sub-tools, such as example sub-tools 206A-206C.

Arrangement of the sub-tools on a wide diameter and a narrow diameter of the pod 204 may also be symmetrical. In an example, the wide diameter is in reference to the outermost diameter of the pod 204, at which point a sub-tool is attached either to an inner or to an outer portion of a bow 208 in the pod 204. A narrow diameter may be in reference to when a sub-tool is located at an inner or outer portion of the bow 208 in the pod 204 at a location closer to hub 214A or hub 214B. In application, the sub-tool on the outer-most diameter of the pod 204 would make the sub-tool closer to the extreme circumference of the bore away from its core or center, 6 while the sub-tool arrange on a bow of the pod 204 to be closer to the hub would make the sub-tool closer to the core of the bore. One or more of hubs 214A, 214B may be part of the pressured housing and may include components such as at least one processor, a transmitter (e.g., telemetry) component, at least one light coupler, at least one temperature, pressure, and density measurement component, and at least one power management component. FIG. 2 also illustrates, in image excerpt 206, a partial perspective view of a sub-tool having at least one optical interface 212 for interfacing between the tool and the fluid. The sub-tool has a body 210 for protecting its interior elements and for associating with bow 208.

Tool 200 replaces multiple compartments and sub-tools illustrated in FIG. 1 and, in doing so, enables the tool 200 to have better accessibility, less susceptibility to damage, easy maintenance of the tool and the sub-tools, and direct determination of productivity Index, for instance. Tool 200 is able to operate in harsh environments because of the body 210 on each sub-tool providing robust design and protection for the sub-tools in open hole/coiled tubing applications. Such applications require operations to be conducted at temperatures of 180° C., with pressures of 15 Kpsi, and with gas levels of 2% $H_2S$ and 10% $CO_2$. Furthermore, tool 200 by virtue of sub-tools 206A-206C, is able to detect asphaltene. Tool 200 enables a downhole formation lab with multimodal measurement capability for the various phases in a fluid in downhole applications. In an example, fluid, as used throughout this disclosure unless indicated otherwise refers to combinations or singular components of liquid media and gas. Further, open-hole formation logging is enabled by tool 200, along with mid-infrared detection for higher hydrocarbon (HC) detection. Digital components at hubs 214A, 214B are enabled by silicon carbide/silicon-on-insulator (SiC)/SOI electronics with chip equivalent series resistance (ESR) and microwave deployment. This infrastructure enables downhole computation and real time data analytics from the fluid. Component 216, in an example, enables e-line communication, while optoelectronics and electronics features may be retained in pressured housing 202. FIG. 2, therefore, illustrates components of a high temperature-high pressure (HTHP) packaged light source and detector that is ready for placement inside the pressure housing.

Figure 3:
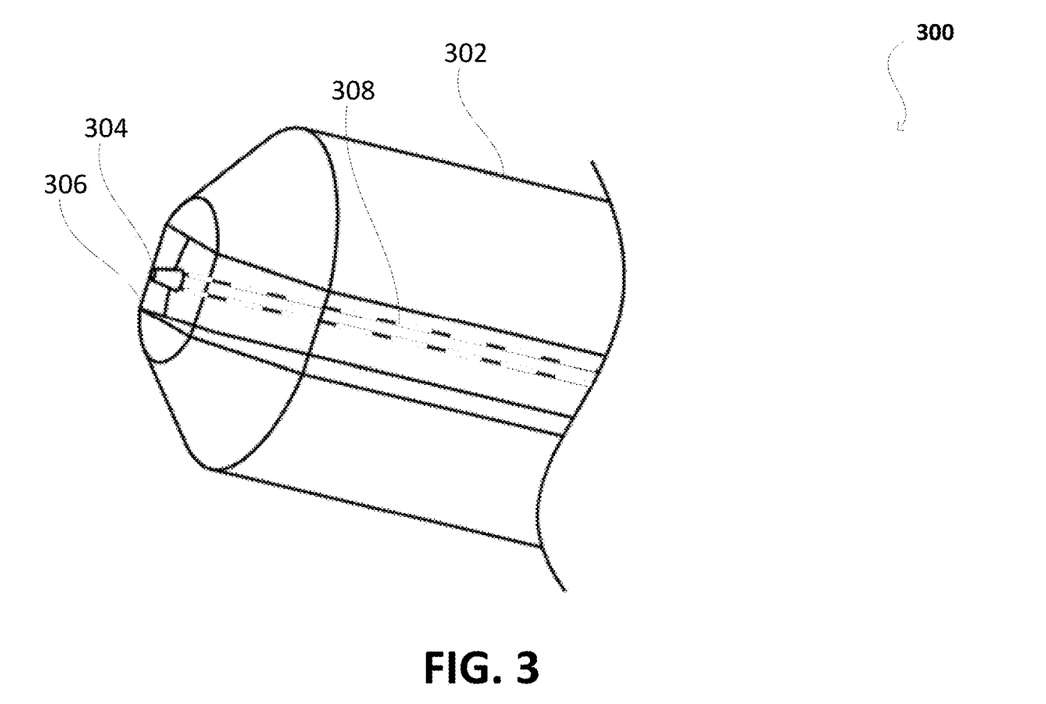
FIG. 3 illustrates an example of a sub-tool on a tool for detection and measurement of phases in fluid in downhole applications, in accordance with various embodiments.

FIG. 3 illustrates an example of a sub-tool 300 on a tool (e.g., too 200) for detection and measurement of phases in fluid in downhole applications, in accordance with various embodiments. FIG. 3 particularly illustrates at least one optical interface 304 for interfacing between the tool and the fluid. The at least one optical interface 304 is illustrated as a conical protrusion from at least one optical path 308 integral or coupled to the at least one optical interface 304 of the body. The protrusion may be through an opening 306 provided in the body, which may be otherwise sealed. In an alternate aspect the opening 306 is accessible to the fluid so that detection and measurement of the fluid may occur elsewhere than the at least one optical interface 304. The at least one optical path 308 transmits first light into the fluid at the at least one optical interface. For example, by total internal reflection (TIR), the first light travels from at least one light coupler till it attains evanescence to be disturbed by fluid at the at least one optical interface. In an example, the disturbance may be by an absorption of part of wavelengths of the first light so that, after the at least one interface, second light proceeding via TIR is an attenuated total internal reflection (ATR) light. The at least one light coupler is able to detect the second light, which may have components of the first light and of the attenuated first light (representing by the second light). For example, intensities of one or more of the components of the first light may have changed by the absorption and the second light may include the one or more components in the changed intensities. Some of the components may not even be present in the second light compared to the first light. The at least one optical interface 304 may be a sapphire crystal. The at least one optical interface is integral (e.g., at an end) to the at least one optical path 308 and may be made of a single sapphire crystal. Alternatively, the optical interface 304 includes a material that has at least a higher refractive index than the fluid. This implies that the higher refractive index is at least higher than the components of the fluid—e.g., oil, water, and gas.

As such, the tool of the present disclosure uses evanescent wave coupled spectroscopy involving an optical discrimination technique and that utilizes a high temperature light source as part of a coupler (e.g., a laser/LED). The high temperature light source is further supported by an optical fiber, forming at least one optical path, and an attenuated total internal reflection (ATR) sensor, forming a part of the at least one optical interface. The at least one optical path and the at least one optical interface rely, at least in part, on the principle of total internal reflection (TIR) and spectroscopy. Further, the light coupler may include a light source for coherent or incoherent light and may include a detector for these lights as well. Development of a wider wavelength range in high temperature laser/LED sources enables in-situ fluid composition analysis, which is used herein and which can be extended to measure gaseous components, such as $H_2S$ and $CO_2$. In addition, 2 or 3 color lasers/LED, whose photons are absorbed solely by corresponding target-species or components of the fluid (gas/oil/water), along with evanescent total internal reflective and absorption ATR are supported by the optical components of the present disclosure. Such features provide a binary response for each sensor for the different components of the fluid. Semiconductor laser/LED-based spectroscopy, sometimes known as tunable diode laser absorption spectroscopy (TDLAS), is an aspect that is readily understood by a person of ordinary skill reading the present disclosure and is readily applicable to the present sub-tools and tool. Semiconductor lasers/LEDs and detectors also reduce or eliminate a need for either filter arrays or diffraction gratings in spectroscopy. This removes mechanical moving parts from the system and hence improves the reliability of the system. The present tool, by virtue of the sub-tools configured to measure components of a fluid, for instance, is also able to detect moisture in natural gas for pipeline applications.

Figure 4:
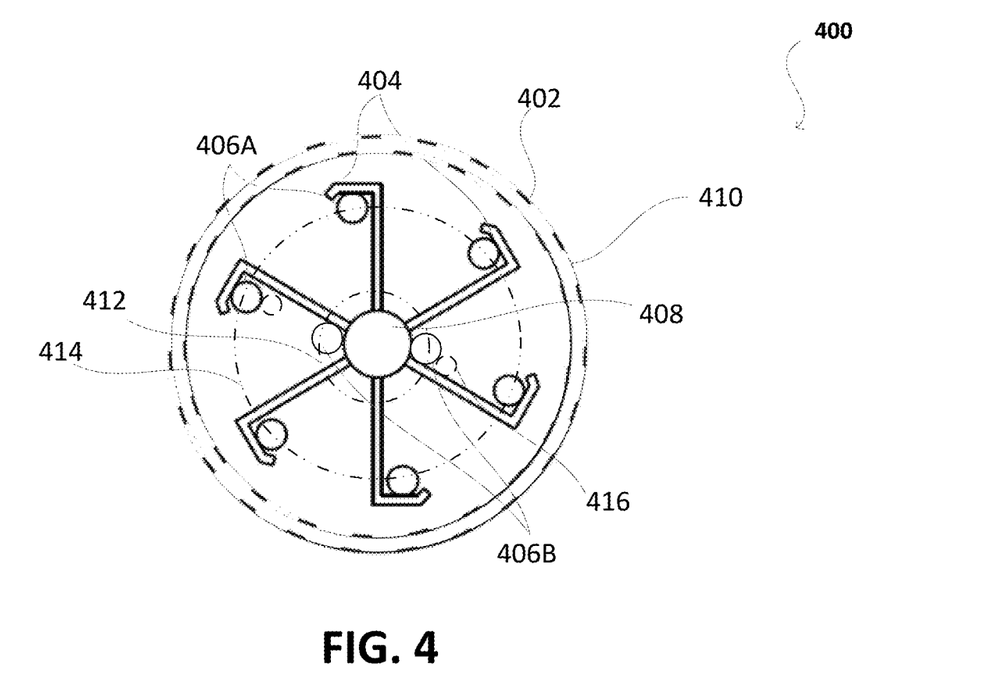
FIG. 4 illustrates an example of arrangement of sub-tools on a tool for detection and measurement of phases in fluid in downhole applications, in accordance with various embodiments.

FIG. 4 illustrates an example of arrangement 400 of sub-tools 406 for detection and measurement of phases in fluid in downhole applications, in accordance with various embodiments. FIG. 4 particularly illustrates a first sub-tool (e.g., one of sub-tools 406A) arranged on a bow (e.g., one of bows 404) forming a pod (illustrated as the bows within dotted line 410) around a circumference of a downhole instrument 408. In an aspect, the pod 410 is merely illustrated to show the collection of bows 404 and no physical covering exists—that is, dotted line 410 is not a physical cover over the bows 404. Further, a second sub-tool (e.g., one of sub-tools 406B, different from the first sub-tool) may be arranged on the same bow (i.e., one of bows 404). While this example is to the two aforementioned sub-tools 406 on the same bow, the illustration shows that the sub-tools 406A, 406B may be on different bows. The second sub-tool 404B is, therefore, at a second diameter 412 for the pod 410 and the first sub-tool 406A is at a first diameter 414 of the pod 410. As illustrated, the second diameter 414 is smaller than the first diameter 412. This implies that the sub-tools 406A are along an outer part of a borehole or bore pipe relative to the sub-tools 406B, when the downhole instrument 408 is in a downhole application. As such, a measure of fluid properties at the walls of the bore pipe along with fluid properties at about a central region of the bore pipe may be averaged (or statistically combined in any appropriate way) and/or may be used to measure each of the phases in the fluid. As the sub-tools 406A, 406B together provide the detection and measurement of phases in the fluid, the reference to a tool is taken to include reference to the sub-tools and reference to the sub-tools is taken to affect capabilities of the tool that includes the sub-tools.

Further, sub-tool 416, two of which are illustrated, adjacent to one or more of the sub-tools 406 may be velocity tools, such as a spinner tool. Single point sensors, as the illustrated sub-tools may be, can be designed in circular arrays with up to 12 sensors arranged in a bow arrangement to accommodate different diameter tubing. The bow is also referred to as a spring bow in this disclosure. Such design causes minimum flow regime change, minimizes flow restriction, and maximizes fluid interaction with the sensor array, as shown in FIGS. 2 and 3.

Figure 5:
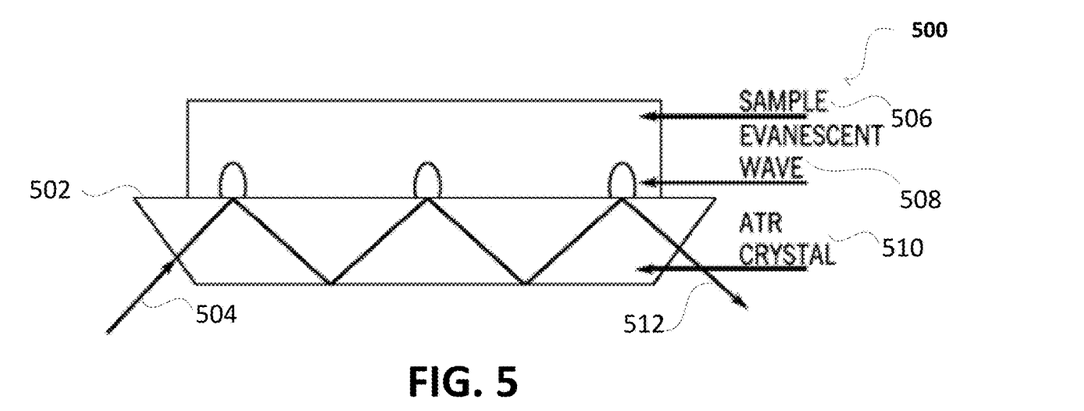
FIG. 5 illustrates an example of an interface between a fluid and a tool for detection and measurement of phases in the fluid, in accordance with various embodiments.

FIG. 5 illustrates an example 500 of an interface 502 between a fluid 506 and a tool for detection and measurement of phases in the fluid 506, in accordance with various embodiments. The tool includes the interface 502, associated with optical path 510, by virtue of including a sub-tool that has the interface 502. At least one light coupler provides the first light 504 to at least one optical interface 500. As the tool may include multiple sub-tools, it may also then include multiple light couplers, multiple optical paths, and multiple optical interfaces. The at least one light coupler also receives, from the optical interface 502, a second light 512 that may include attenuated and remaining wavelengths (or light intensities) from the first light. At the optical interface 502, wave evanescent occurs due to one or more of the first light including a first range of evanescent-field-amplitude and a second range of optical-energy. These features enable the transmission of the first light 504 into the fluid 506 as an evanescent wave 508, at the optical interface 502.

Figure 6:
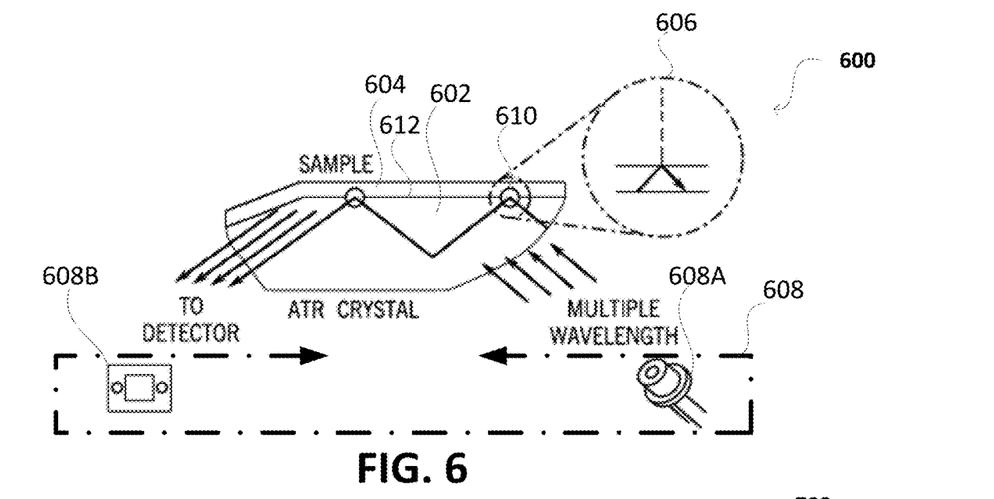
FIG. 6 illustrates further details of an example of an interface between a fluid and a tool for detection and measurement of phases in the fluid, in accordance with various embodiments.

FIG. 6 illustrates further details 600 of an example of an interface 612 between a fluid 604 and a tool for detection and measurement of phases in the fluid, in accordance with various embodiments. Aspects already described with respect to FIG. 5 are applicable here and are readily understood to a person of ordinary skill in the art; so omission of such aspects does not constitute an implication that they may not exist. Further, all the disclosed embodiments may be modified or combined by a person of ordinary skill in the art who will readily find such teachings in this disclosure. A light coupler 608 provides light, such as a laser light, via component 608A, which may be a laser, and may receive light, via component 608B, which may be a detector. An evanescent field 606, 610 is illustrated as being formed at the interface 612 that causes attenuation of the initial light from component 608A. Absorption of wavelengths of the initial light may also occur at the interface 612 with the fluid 604. The light traveling the detector 608B may be further attenuated and/or absorbed at multiple points of interface 612, as illustrated. Light disturbed at one or at multiple point of the interface 612 may be referred to herein as the attenuated total internal reflection (ATR) light. The final light detected by component 608B may be the second light referenced throughout this disclosure. As such, the detector 608B may be configured to detect ATR immediately after one point of interface 612 or after multiple points of interface 612.

Briefly, in application, ATR light is associated with real time absorption spectroscopy-based optical wireline production tools. The fluid surrounds sensor e.g., at one or more points of interface 612 which includes the optical path 606, such as a waveguide. The initial light injected into the optical path has evanescent-field-amplitude and optical-energy to penetrate the fluid. Evanescent-field absorption at the points on interface 612, where the light penetrates the fluid, causes disturbance, such as attenuation, of initial light. Concurrent or subsequent light may be used in the embodiments herein. For example, lights of three color lasers, concurrently or one after the other, and whose photons are absorbed solely by a corresponding target-species (gas/oil/water) may be used as the initial light. As such, component 608A may include sub-components for providing each of the three color lasers. Then the second light, i.e., disturbed light, is concurrently or separately received by detector 608B, which may include sub-detectors for each of the three color lasers.

In embodiments herein, the optical interface providing ATR optical sensing can be designed such that it can generate multiple reflection points along the optical length when the light is being coupled to the sensor at a desired incidence angle. For each of the reflection points, an evanescent field can be generated whose wavelength is substantially the same as the incident wavelength, as shown in FIG. 6. In example embodiments of the disclosure herein, the number of reflection points can be proportional to the loss in intensity due to absorption/fluorescence by the targeted species (one design target for such optical ATR element can be to maximize the number of reflections, typically about 50-100 nos). A proposed miniaturized ATR optical element (e.g., about 200 um diameter, 10 mm length), along with an HTHP opto-mechanical housing, can be aero and hydro dynamically designed so that they do not disturb any flow pattern and hence are minimally intrusive. In addition, the element can be designed such that mud or particles tend to not stick to its outer surfaces, as shown in FIGS. 2 and 3.

Figure 7:
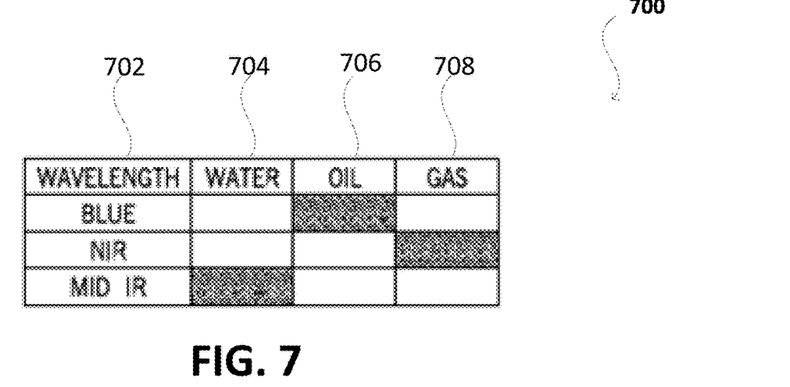
FIG. 7 illustrates an example of phases detected for a fluid using a tool for detection and measurement of phases in the fluid, in accordance with various embodiments.

FIG. 7 illustrates an example 700 of phases 704-708 detected for a fluid using a tool for detection and measurement of phases in the fluid, in accordance with various embodiments. Each of the wavelengths 702 correspond to one of three color lasers referenced with respect to the description for FIG. 6. Blue, near infrared (NIR), and mid infrared (MIR) may be used, as illustrated. Also illustrated as the corresponding target-species (gas, oil, or water) that absorb photos of the wavelengths 700 provided. For example, water 704 disturbs MIR wavelength, which has no effects from oil or gas. Blue laser is disturbed by oil 706 but not by water or gas, and NIR is disturbed by gas 708, but not by water or oil.

Figure 8:
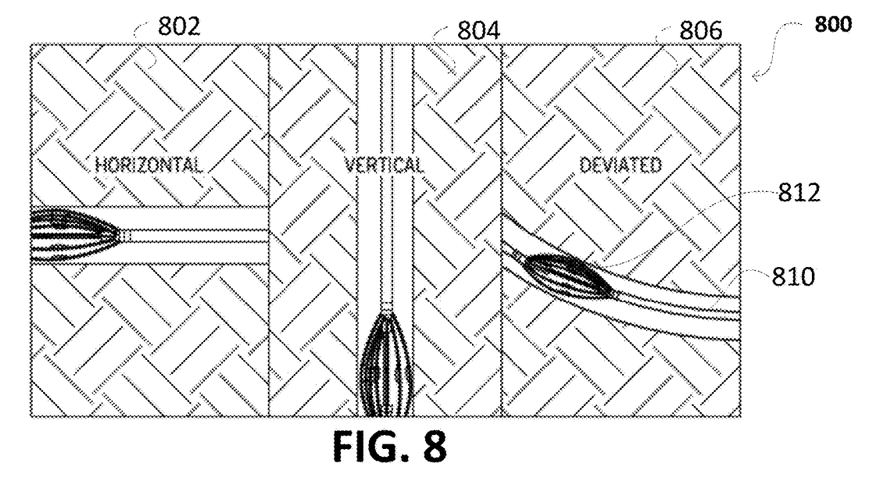
FIG. 8 illustrates examples of usage and maneuverability of a tool for detection and measurement of phases in a fluid in downhole applications, in accordance with various embodiments.

FIG. 8 illustrates examples 800 of usage and maneuverability of a tool 810, 812 for detection and measurement of phases in a fluid in downhole applications, in accordance with various embodiments. In this and other embodiments, reference to detection and measurement of phases in a fluid is taken to mean detection and measurement of mixed components in a fluid—i.e., gas, water, and oil (in any combination) mixed together is referenced as the fluid. The fluid may have only gas, only water, only oil, or a combination of two or more of these phases. Further, the reference to fluid does not limit the fluid to a single state, but accommodates variations of states of a chemical—i.e., fluid may also include a liquid and a gaseous state of the same chemical, but may also include separate chemicals, e.g., crude oil, water, and any combination of downhole gases. FIG. 8 illustrates that the tool, which may include the downhole instrument 810 and the pod 812, is able to be maneuvered into horizontal below surface boreholes 802, vertical below surface boreholes 804, and deviated below surface boreholes 806. This removal of multiple pods (e.g., as in the case of FIG. 1) enables such borehole access, reduces possibility of damage, and eases maintenance by focusses on single pods alone, for instance (e.g., as in the case of FIG. 2).

Figure 9:
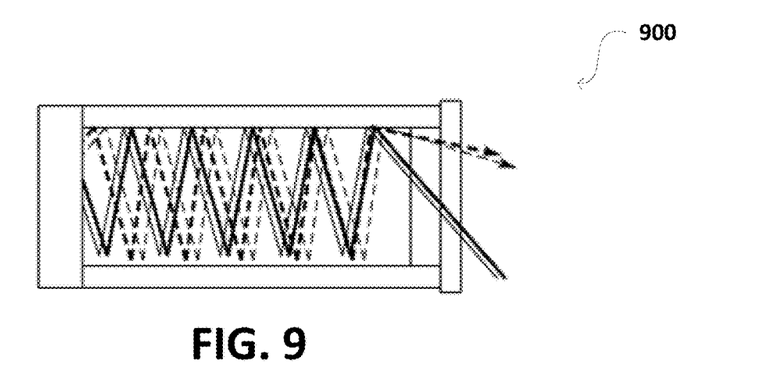
FIGS. 9 and 10 illustrate examples of optical properties provided to a tool for detection and measurement of phases in a fluid in downhole applications, in accordance with various embodiments.
Figure 10:
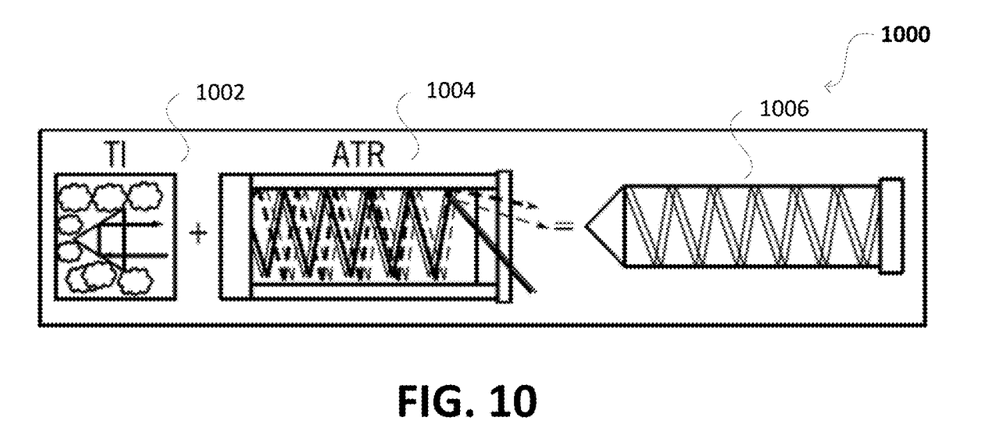

FIGS. 9 and 10 illustrate examples 900, 1000 of optical properties provided to a tool for detection and measurement of phases in a fluid in downhole applications, in accordance with various embodiments. FIG. 9 illustrates an embodiment having wavelength dependent evanescent field attenuation (ATR) alone where the optical path is designed for higher order leaky mode attenuation. FIG. 10 illustrates an embodiment having both, the aspect 900 (referenced here as 1004) and total internal reflection (TIR) 1002 at the optical interface, which is also illustrated as a tapered tip, which both contribute to the detection and measurement of phases in a fluid in downhole applications. In example 1000, the combination of TIR and ATR is designed to exploit higher order leaky mode attenuation in the broader implementation of the combined aspect 1006. In an example, a length and/or a diameter of the optical path (and optionally of the interface) may be associated with sensitivity of the tool. For an optical path having a length of 70 mm and a diameter of 300 µm, a light wavelength of 2.5 mm is wholly affected by water, but is transmitted by air and oil without disturbance. A light wavelength of 0.4 µm is partly affected by oil but fully transmitted by air and water. A light wavelength of 0.26 µm is wholly affected by oil but fully transmitted by air and water. As such, using these three wavelengths and for the length and diameter of the optical path (and optionally of the interface), a detection and measurement of gas, oil, and water, may be made. From the above, initial light (i.e., first light provided to penetrate the fluid) including one or more components of the above-reference light wavelengths may be provided concurrently or separately so that a detector in the light coupler is able to concurrently or separately detect disturbances, if any, to the initial light. Optical data, as in received intensities, for example, from the disturbance, is digitalized and provided to a surface component.

Figure 11A:
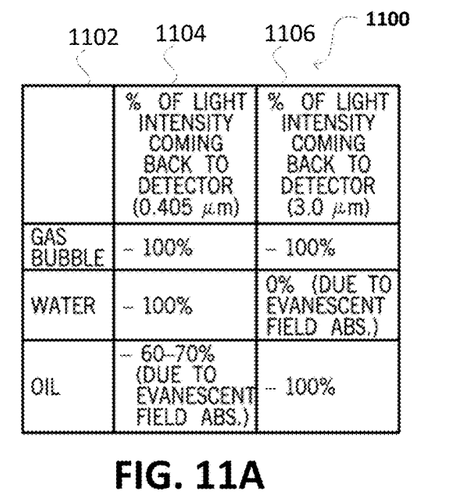
FIGS. 11A and 11B illustrate examples of light properties determined for a fluid from different lights for a tool having different optical properties, such as in FIGS. 9 and 10, for detection and measurement of phases in a fluid in downhole applications, in accordance with various embodiments.
Figure 11B:
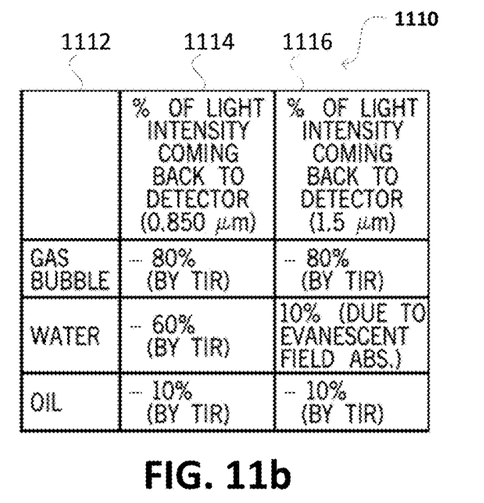

FIGS. 11A and 11B illustrate further examples 1100, 1110 of light properties determined for a fluid from different lights in a tool having different optical properties, such as in FIGS. 9 and 10, for detection and measurement of phases in a fluid in downhole applications, in accordance with various embodiments. For example, example 1100 illustrates a mapping of wavelength and phase for a tool having ATR alone (FIG. 9), while example 1110 illustrates a mapping of wavelength and phase for a tool have a combination of TIR and ATR (FIG. 10). FIG. 11A particularly maps, as an example 1100, phases 1102 within a fluid as measured from disturbed light (i.e., second light) relative to the initial light (i.e., first light provided to penetrate the fluid). With 0.405 µm light 1104, a 60-70% disturbance by evanescent field absorption occurs for oil, while water and gas do not disturb this light component. With a 3 µm light 1106, a 100% disturbance by evanescent field absorption occurs for water, so 0% of the initial light is detected in the second light, while oil and gas do not disturb this light component. Under a combination of TIR and ATR, with a 0.850 µm light, all phases in the fluid disturb this component, and so, a single component light is sufficient using the combination to detect and measure the different phases in the fluid. Particularly, however, the disturbance in the second light is by different optical or physical properties of the light and of the light guide (including the interface). For example, using the 0.850 µm light 1114, 80% disturbance by TIR occurs for gas, 60% disturbance by TIR occurs for water, and a 10% disturbance by TIR occurs for oil. With 1.5 µm light 1116, 80% disturbance by TIR occurs for gas, 10% disturbance by evanescent field absorption occurs for water, and a 10% disturbance by TIR occurs for oil.

Figure 12:
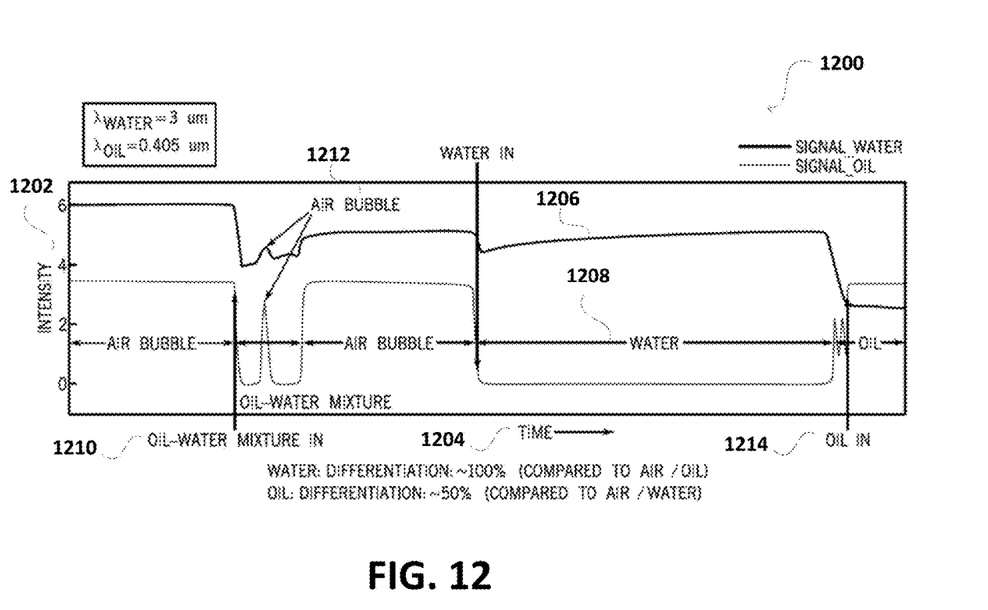
FIG. 12 illustrates an example of phases in fluid and associated light properties determined by a tool for detection and measurement of phases in a fluid in downhole applications, in accordance with various embodiments.

FIG. 12 illustrates an example 1200 of phases in fluid and associated light properties determined by a tool for detection and measurement of phases in a fluid in downhole applications, in accordance with various embodiments. When an implementation, as in the case of FIG. 10 is used, a single wavelength light is disturbed differently by the different phases in the fluid. This implementation requires interpretation of the results differently than using different light components that are solely disturbed by respective phases in a fluid. Example 1200 is a graph between intensity 1202 of disturbed light (second light) versus time 1204 for which the light is asserted at an interface of the tool. Example 1200 uses two light components, 0.405 µm and 3 µm. As previously noted, in FIG. 11A, for instance, water disturbs a 3 µm light component 1208 and oil disturbs a 0.405 µm light component 1206. Therefore, in the graph of example 1200, the initial intensities of the second light do not show remarkable disturbance, which may reflect gas presence (e.g., a gas bubble in the fluid). Over time 1204, however, a remarkable disturbance occurs to lower intensities of both light components 1206, 1208 indicating an oil-water presence 1210 in the fluid. An upward movement 1212 of the intensities of both light components 1206, 1208 indicates further gas in the fluid at the time when such detection occurs. When the intensity of one or more of the light components 1206, 1208 is held higher than a previous low, this may be taken as an indication of a continued gas presence (e.g., graph at reference numeral 1212). Thereafter, a remarkable disturbance of one 1208 of the two light components 1206, 1208 indicates either oil or gas presence depending on the light component being disturbed—e.g., light component 1208 is remarkably disturbed and held in its disturbance for an extended period, while the other light component 1206 is not remarkably disturbed in the same extended period. This reflects presence of water in the fluid at the time at issue. Thereafter, the previously undisturbed light component 1206 is remarkably disturbed while the previously disturbed light component 1208 is returning to undisturbed state indicating introduction of oil in the fluid and reduction of water present at the time of disturbance, and extending after if the disturbance for light component 1206 remains.

Figure 13A:
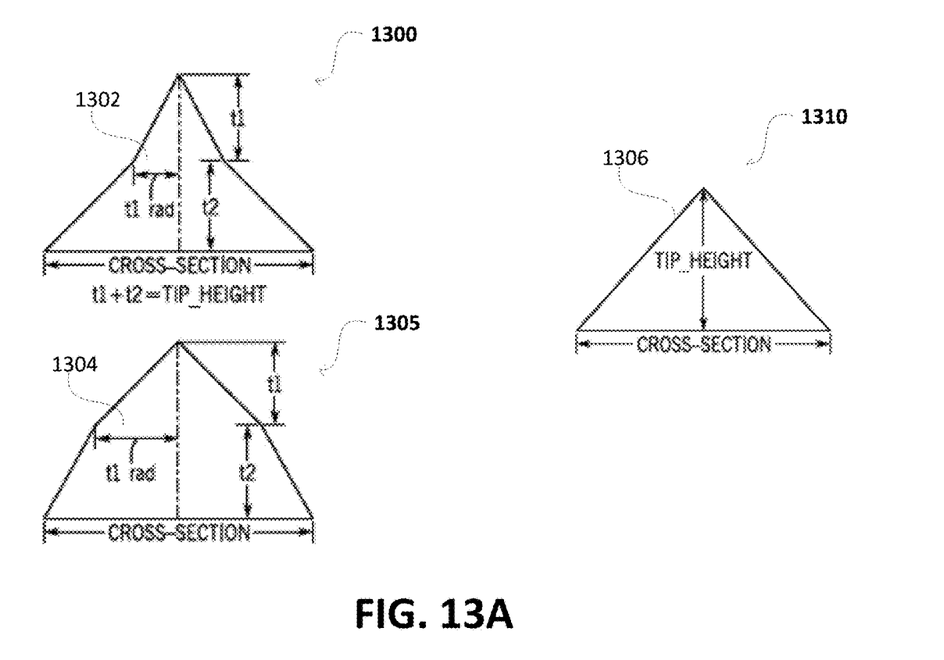
FIGS. 13A and 13B illustrate examples of different tips providing an interface between fluid and a tool for detection and measurement of phases in the fluid in downhole applications and changes to the detection and the measurement as a result of the different tips, in accordance with various embodiments.
Figure 13B:
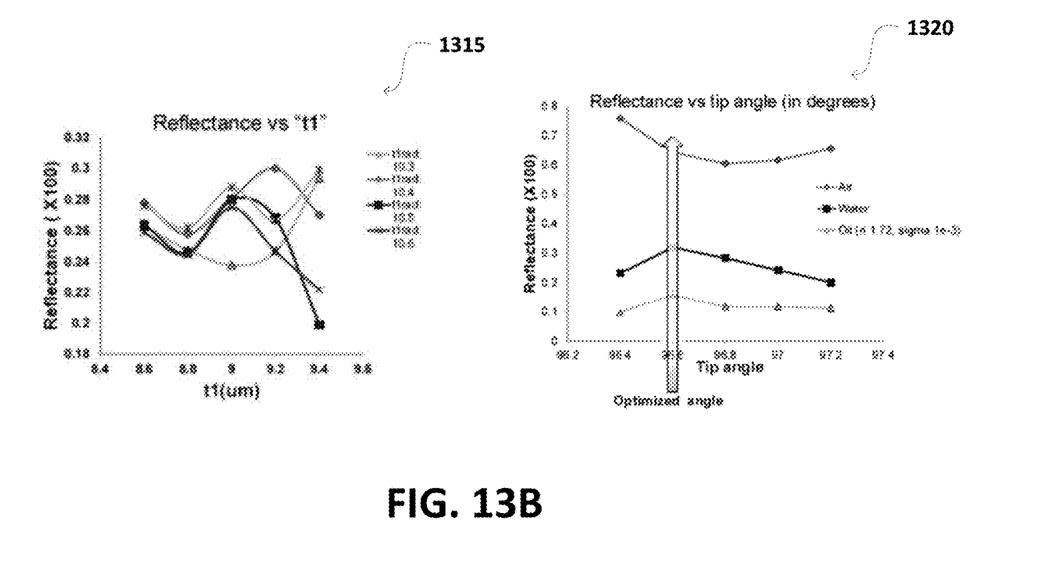

FIG. 13A illustrates examples of different tips 1300-1310 providing an interface between fluid and a tool for detection and measurement of phases in the fluid in downhole applications, in accordance with various embodiments. FIG. 13B illustrates that a shape of the interface, as in case of FIG. 13A, can affect 1315, 1320 detection and measurement of the phases in a fluid. For example, the highest reflectance is appreciated in an interface for each of the three phases. Certain shapes affect the reflectance of the second light in different ways for the difference phases. For example, gas has high reflectance generally, but oil and water demonstrate poor reflectance at lower tip angles, as illustrated in graph 1320 of FIG. 13B. Furthermore, at higher tip angles the reflectance of oil and water are also poor, while gas has slightly better reflectance. Tip angles may be reflected in radians or degrees based in part on one or more of a portion of a width of the tip and a portion of a height of tip. For example, in example tip 1300, t1 1302, 1304 reflects a width that may be used to calculate the tip angle of 48.3 degrees for example tip 1300. Measurement t2 is used to calculate the tip angle knowing t1. As the tip angle changes, reflectance changes for different phases in the fluid, as illustrated in example graphs 1315, 1320 of FIG. 3B. A person of ordinary skill may readily understand from the present disclosure that reflectance and sensitivity of the interface may be changed by changes to the tip angle—i.e., changing the tip height and/or cross-section. Furthermore, it is determined that monotonic slope angle of the cone (at the tip of the optical interface) may not effectively support evanescent properties required to enable penetration of the fluid from the light at the optical interface. For example, the tips in examples 1300 and 1305 have a break at radians t1 1302, 1304 in the sides leading to an apex of the illustrated tips. These breaks in an otherwise monotonic slope angle of the cone—such as in the example 1310—promote evanescent properties for the tip.

Figure 14:
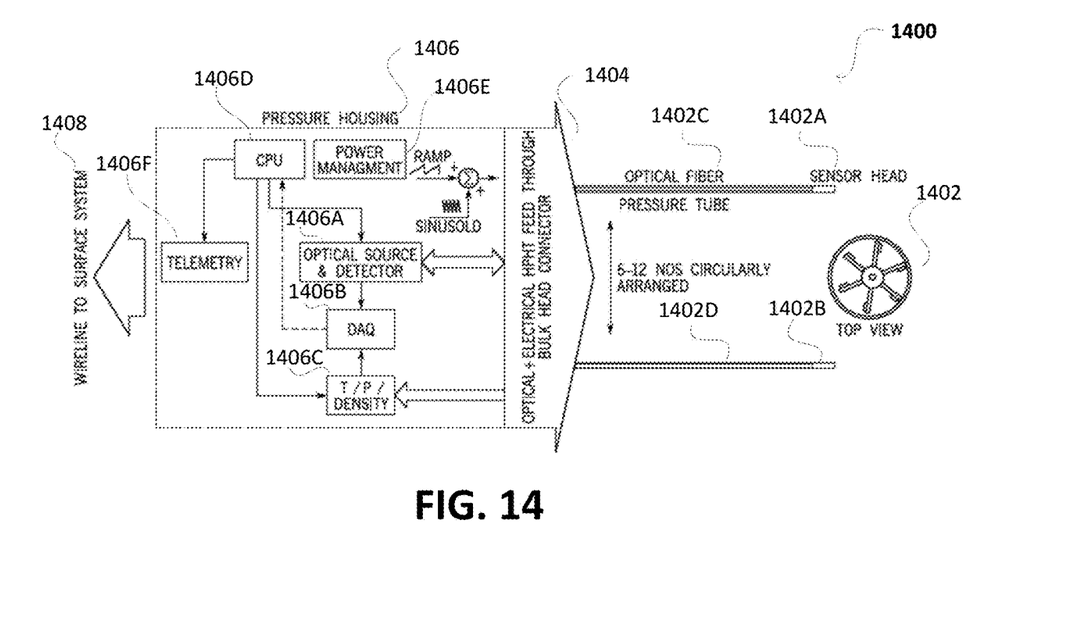
FIG. 14 illustrates example components in a tool for detection and measurement of phases in a fluid in downhole applications, in accordance with various embodiments.

FIG. 14 illustrates example components 1402-1408 in a tool 1400 for detection and measurement of phases in a fluid in downhole applications, in accordance with various embodiments. The tool 1400 for measurement of phases in fluid in downhole applications includes a sensor stage 1402, a connector stage 1404, and a pressured housing stage 1406 that processes and transmits digital data via system 1408. The tool 1400 includes at least one light coupler 1406A for providing a first light and for detecting a second light through connector stage 1404. The first light is provided to at least one optical interface (illustrated in top view and side view, generally). Particularly, two optical interfaces are illustrated 1402A, 1402B. The second light is received from the at least one optical interface 1402A, 1402B. The at least one optical interface 1402A, 1402B is for interfacing between the tool with the fluid. At least one optical path 1402C, 1402D integral or coupled to the at least one optical interface 1402A, 1402B is also provided in the tool for transmitting the first light into the fluid at the at least one optical interface 1402A, 1402B, and for receiving the second light from the at least one optical interface 1402A, 1402B. At least one processor 1406D is provided on the tool 1400 for providing digital data associated with the measurement of phases in the fluid using optical data from at least the second light. The digital data may be processed from the optical data and may be transmitted in a bit stream, by a transmission component 1406F, such as a telemetry component, to a surface component. Such transmission may use the transmission stage 1408 for the transmission of the digital data.

Further, measurement components 1406C for temperature, pressure, and density measurements using the optical data from the first light and the second light is provided within tool 1400 and may use optical data from coupler 1406A or directly from the connector stage 1404. In an example, 6 or 12 sub-tools, as in stage 1402, may be arranged on respective bows of a pod for tool 1400 for performing the present detection and measurement of phases in a fluid. The arrangement may be in symmetrical angles, as seen in the top or cross-section view 1402. For example, the sub-tools are evenly distributed at 30 or 60 degree angles from each other as seen in the bows from the top view 1402. As the sub-tools are illustrated as communicating with a single pressured housing 1406, a person of ordinary skill would recognize that the sub-tools are limited in their components. However, the person of ordinary skill would also recognize from the present disclosure that one or more of the components in the pressured housing 1406 may be distributed to the sub-tools in stage 1402. Furthermore, the pressured housing 1406 includes a power management component 1406E and a data acquisition component 1406, as required to support the CPU 1406D in processing (e.g., digitalizing) the optical data. In an aspect, the power management component 1406E provides tuning capabilities and is also referred to herein as a tuner. Alternatively, the component 1406E includes a tuner, but may provide power to other components. The tuner 1406E is adapted to provide current signals and a carrier signal for the laser to tune the wavelength of the light. In an example, the CPU 1406D generates a bit stream from optical data, such as the intensity data from FIG. 12. In an example, the bit stream may include a first fixed series of bits for high intensity of a first light component and second fixed series of bits for a second intensity of the first light component. Alternatively, a first 4 bits may be used to indicate high intensity, mid-range intensity, and low intensity of a first light component. A second 4 bits may be used in the same manner for a second light component. A bit stream of the 8 bits then provides a receiver with digital data to decode whether gas, water, or oil is present at any time in fluid adjacent to the tool 1400.

Figure 15:
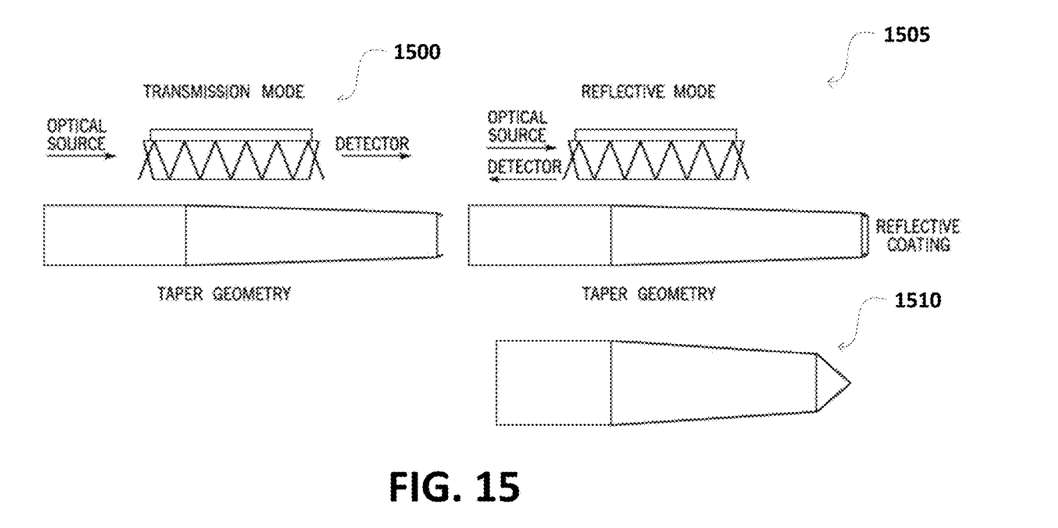
FIG. 15 illustrates examples of different taper geometries available for at least one optical path integral or coupled to at least one optical interface in a tool for detection and measurement of phases in a fluid in downhole applications, in accordance with various embodiments.

FIG. 15 illustrates examples 1500-1510 of different taper geometries available for at least one optical path integral or coupled to at least one optical interface in a tool for detection and measurement of phases in a fluid in downhole applications, in accordance with various embodiments. A coupled at least one optical path and at least one optical interface may be provided by a reflective coating illustrated in example 1505. A tool, as described throughout this disclosure, may include different geometries to the at least one optical path. For example, an amount of taper may be provided in the at least one optical path to the at least one optical interface at its tip. The taper enables a first light to enter and exit from the same or from a different part of the at least one optical path, as illustrated in examples 1500, 1504. A person of ordinary skill would readily understand the adjustments to the taper to enable a tool of the present disclosure based in part on these examples.

Figure 16:
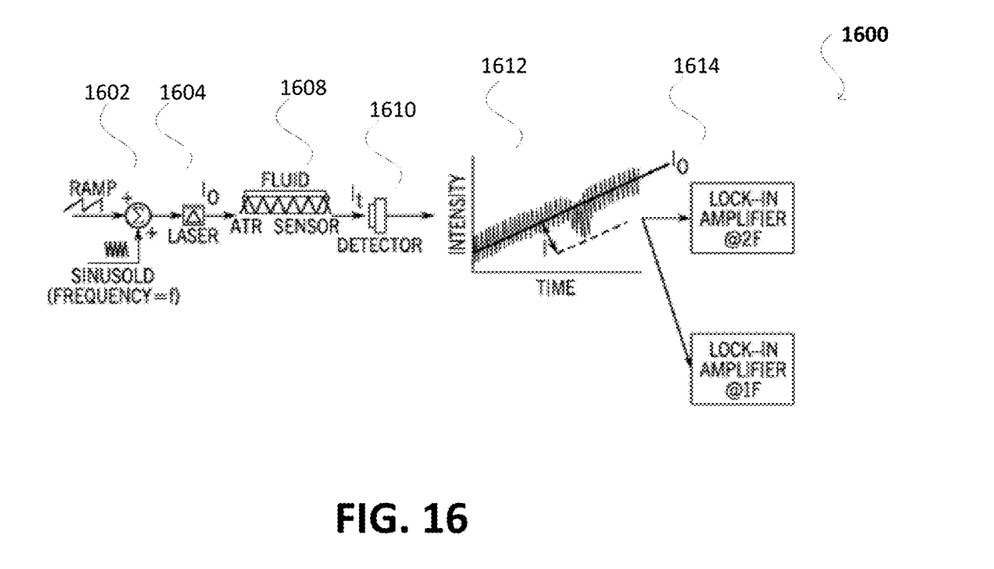
FIG. 16 illustrates an example process flow for a tool used in detection and measurement of phases in a fluid in downhole applications, in accordance with various embodiments.

FIG. 16 illustrates an example process flow 1600 for a tool used in detection and measurement of phases in a fluid in downhole applications, in accordance with various embodiments. At step 1602, specific type of input (e.g., ramp input and sinusoidal input) of a current waveform is provided to trigger at least one optical coupler having a light source, such as a laser. Alternatively, temperature of the light source, in at least the case of a laser light source, may be modulated—alone or along with the current waveform—to adjust the wavelength of the light for measurement and detection of phases of the fluid. This enables a user to control the specific wavelength and applied period of a first light. The laser provides the light in step 1604 to at least one optical path. In step 1608, ATR commences for a fluid near at least one optical interface of the tool. At step 1610, the at least one coupler having a detector detects second light that has light components disturbed by the fluid using one or more of TIR and ATR induced absorption. Intensity of the light is provided in optical data at step 1612. Lock-in amplifiers at step 1614 analyze the optical data to provide digital data of changes in intensity over time—in real time. In an example, while oil disturbs between 400-450 nm wavelengths of light components and water disturbs between 1440-1900 nm wavelengths of light components, the tool of the present disclosure can also detect and measure different types of gasses—e.g., $H_2S$ may disturb between 1590 nm & 2640 nm wavelengths of light components, $CO_2$ disturbs 1581 nm, 2051 nm, and 4225 nm wavelengths of light components, and $CH_4$ disturbs 3300 nm wavelength of a light component.

In aspects of this disclosure, the light incident on the optical interface for testing the fluid is a modulated light. As such, an input provided to the light source in step 1604 is a combination of a carrier wave provided by the sinusoidal waveform and the ramp waveform, which provides the specific intended wavelength of the light to be generated. In an example, the ramp waveform is of 1 KHz frequency while the sinusoidal carrier waveform is about 10 KHz frequency with 10-50% modulation depth, but these example frequencies and modulation depths are not limiting in any way. Further, as returned light may be of very low intensity, sometimes at 0.001% of the incident light, it may not be accurately detected. For at least this reason, the lock-in amplifiers in step 1614 are provided to enable heterodyne detection of the returned light. Returned light, as charted in step 1612, may be multiplied with the input carrier waveform, such as the sinusoidal wave, or other relevant carrier waveform in the lock-in amplifier at step 1614. Filters may be used to extract direct current (DC) aspect of the signal, while rejecting direct current (DC) aspects.

In further aspects of this disclosure, multiple methods are available to detect the returned light, including by using a different light detector for each waveform range. This process of using a different detector may be more complicated as it requires coordinating timing of the detection circuit so that each returned waveform or the specific waveform from a returned spectrum is read properly. For example, Time Division Multiplexing (TDM) may be used with a single detector to analyze the returned light for a specific wavelength. The TDM process, however, may not be able to detect more than 60 KHz frequencies which is also dependent on the detector being used. Separately, Frequency Division Multiplexing (FDM) may be used in a detector to enable detection of different waveforms simultaneously. A transform may be performed for the returned light using one or more Fast Fourier Transforms (FFTs), for instance. The one or more FFTs may provide a spectrum of harmonics corresponding to different frequencies in the returned spectrum. As such, select frequencies may be detected and other harmonics rejected using FDM.

Figure 17:
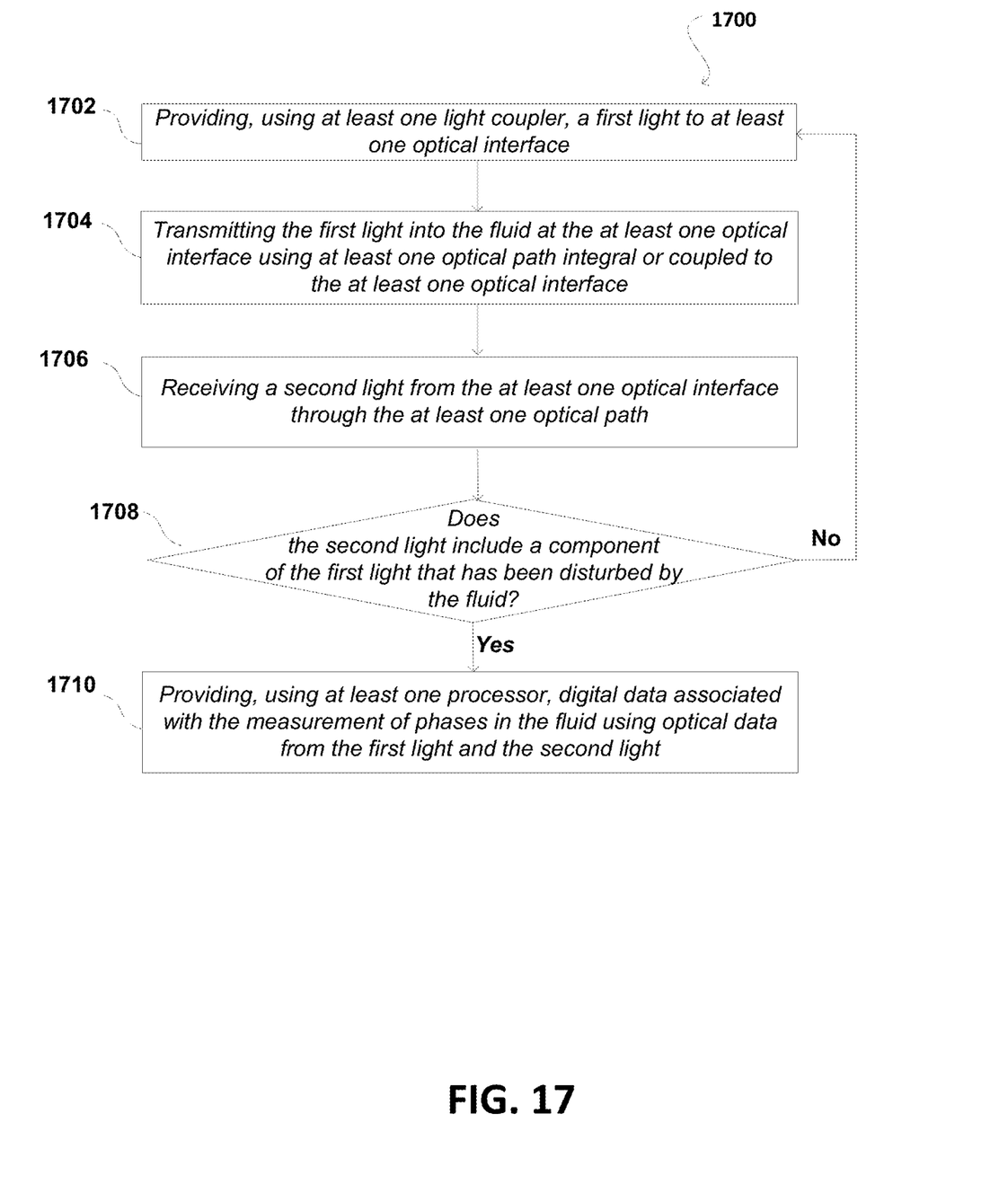
FIG. 17 illustrates another example process flow for a tool used in detection and measurement of phases in a fluid in downhole applications, in accordance with various embodiments.

FIG. 17 illustrates another example process flow 1700 for a tool used in detection and measurement of phases in a fluid in downhole applications, in accordance with various embodiments. Sub-process 1702 provides, using at least one light coupler, a first light provided to at least one optical interface. Sub-process 1704 enables transmitting the first light into the fluid at the at least one optical interface using at least one optical path integral or coupled to the at least one optical interface. Sub-process 1706 receives a second light from the at least one optical interface through the at least one optical path. Sub-process 1708 determines if the second light includes one or more light components that is disturbed by the fluid. Sub-process 1710 provides, using at least one processor, digital data associated with the measurement of phases in the fluid using optical data from the first light and the second light when a determination is made that the one or more light components is disturbed by the fluid. As process flow 1700 is in real-time, if no disturbance occurs, sub-process 1702 is repeated to continuously monitor and measure the fluid in a downhole application.

The present disclosure enables identification and localization of production anomalies, For example, having one or more flow meters placed in the lateral section of a horizontal well provides irregular values that may be verified using log data of the present tool. Direct determination of productivity index, as well as reliable commingled production is enabled because the present tool is capable of multiple zone production and observation by virtue of the sub-tools being located at different positions on a spring bow, for instance. Reduction of surface well test and surface facilities are enabled as well because of the continuous monitoring of fluid and the specific data provided to the surface unit or component. As such, all required measurements may be taken at the same depth, simultaneously, which improves the quality and reliability of the data. Further, shorter equipment as in the singular pod or compartment, in the downhole instrument, enables the present tool to access multilateral wells. The shorter tool has a shorter string that enables better accessibility and encounters less restriction. As a result, more data is obtained and available with lesser susceptible to damage and lesser downtime or repair requirements. Further, the present tool enables more accuracy in the three-phase fluid environment (e.g., environments having 0-100% GVF), as explained using the many embodiments throughout this disclosure. Still further, the use of sub-tools in the manner illustrated supports ease of maintenance and enables plug and play-type application to replace the sub-tools.

The system of the present disclosure also provides features of a GOWAT to complement certain software. Such software may be configured for multiple array production suites (MAPS) technology and architecture. Measurement data, also referred to herein as log data, from each sub-tool may be plotted in a chart (e.g., gas array tools (GAT) chart for two phase measurement). A person of ordinary skill reading the present disclosure would readily understand to plot the measurement data from each of the sub-tools so that they can be stitched together (e.g., combined or projected) to provide a cross-section of a phase map. The phase map data from GOWAT and velocity data from the SAT provide the GOR values previously referenced. In an example, the velocity data is from the above-referenced spinner tool adjacent to the sub-tools for phase detection. The velocity data at any point in time may be used with the phase detection to provide volume of the phase at that point in time, akin to a volume flow rate. For example, knowing a cross-sectional area of bore subject to the present phase measurement and detection, and knowing the velocity from the velocity data of a specific phase detected, the volume flow rate is determined from a product of these two quantities for that specific phase. As such, the present disclosure enables measurement and detection of phases in the downhole, data for which is then provided to a surface unit or component.

From all the above, a person of ordinary skill would readily understand that the tool of the present disclosure provides numerous technical and commercial advantages, and can be used in a variety of applications. Various embodiments may be combined or modified based in part on the present disclosure, which is readily understood to support such combination and modifications to achieve the benefits described above. Implementation of optoelectronics and mechanical high temperature high pressure (HTHP) design and packaging of the tool enables operation in harsh downhole conditions. Real-time logged data can be transmitted from the tool through an electronic or E-line communication to a topside system and software at a surface unit or component that provides three phase flow and real-time visualization of gas-oil ratio (GOR) in the well.

What is claimed is:

1. A plurality of tools for measurement of phases in fluid in downhole applications, an individual tool of the plurality of tools comprising:
    at least one light coupler to provide a first light for a downhole instrument, to receive a second light, and to interface between the individual tool and the fluid, the plurality of tools to be located in diametrically different positions on different bows of a plurality of bows forming a pod around a circumference of the downhole instrument;
    at least one optical path associated with the at least one light coupler to:
        enable transmission of the first light into the fluid, and
        enable receipt of the second light, the second light comprising one or more light components of the first light that has been disturbed by the fluid; and
    at least one processor to provide digital data associated with the measurement of phases in the fluid using optical data from at least the second light.

2. The plurality of tools of claim 1, further comprising:
    at least one optical interface associated with the at least one light coupler; and
    the plurality of tools to enable the optical data to be provided to the at least one processor.

3. The plurality of tools of claim 1, further comprising:
    an individual bow of the plurality of bows comprising more than one of the plurality of tools.

4. The plurality of tools of claim 1, further comprising:
    a first set of the plurality of tools arranged on first bows of the plurality of bows; and
    a second set of the plurality of tools arranged on the first bows or on second bows of the plurality of bows and at a second diameter for the pod with the first set of the plurality of tools at a first diameter of the pod, the second diameter being smaller than the first diameter.

5. The plurality of tools of claim 1, further comprising:
    a measurement component to enable measurements of temperature, pressure, and density using the optical data from the first light and the second light and to provide the digital data; and
    a transmitter for transmitting the digital data to a surface component.

6. The plurality of tools of claim 1, wherein the first light comprises a first range of evanescent-field-amplitude and a second range of optical-energy to enable the transmission of the first light into the fluid at at least one optical interface of the at least one light coupler.

7. The plurality of tools of claim 1, wherein the second light is associated with one or more of an attenuation or absorption of at least a portion of the first light.

8. The plurality of tools of claim 1, wherein the at least one optical path enables total internal reflection (TIR) for the first light and enables attenuated total internal reflection (ATR) for the second light.

9. The plurality of tools of claim 1, wherein the at least one optical path enables the second light to travel with the first light to the at least one light coupler.

10. The plurality of tools of claim 1, wherein the at least one light coupler is adapted to transmit laser as the first light through a sapphire crystal that is adapted to function as the at least one optical path.

11. The plurality of tools of claim 1, wherein the phases comprise a gas phase, a water phase, and an oil phase, and wherein the optical data comprises variations of intensities in different wavelengths from the first light, the different wavelengths associated with the phases.

12. The plurality of tools of claim 1, further comprising:
a tuner for the at least one light coupler, the tuner adapted to tune the plurality of tools to select a wavelength of one or more components of the first light, wherein the one or more components include lights of different wavelengths that are separately or concurrently provided by the at least one light coupler after the tuning.

13. A method for measurement of phases in fluid in downhole applications, comprising:
providing, using at least one light coupler of an individual tool in a plurality of tools, a first light for a downhole instrument, the plurality of tools to be located in diametrically different positions on different bows of a plurality of bows forming a pod around a circumference of the downhole instrument;
transmitting the first light into the fluid;
receiving a second light comprising one or more light components of the first light that has been disturbed by the fluid; and
providing, using at least one processor, digital data associated with the measurement of phases in the fluid using optical data from the first light and the second light.

14. The method of claim 13, further comprising:
providing at least one optical interface associated with the at least one light coupler; and
enabling the optical data to be provided from the plurality of tools to the at least one processor.

15. The method of claim 13, further comprising:
enabling an individual bow of the plurality of bows to comprise more that one of the plurality of tools.

16. The method of claim 13, further comprising:
arranging, on first bows of the plurality of bows, a first set of the plurality of tools; and
arranging, on the first bows or on second bows of the plurality of bows, a second set of the plurality of tools at a second diameter for the pod with the first set of the plurality of tools at a first diameter of the pod, the second diameter being smaller than the first diameter.

17. The method of claim 13, further comprising:
measuring, using a measurement component, measurements of temperature, pressure, and density using the optical data from the first light and the second light and to provide the digital data; and
transmitting, using a transmitter, the digital data to a surface component.

18. The method of claim 13, wherein the first light comprises a first range of evanescent-field-amplitude and a second range of optical-energy for enabling the transmission of the first light into the fluid at at least one optical interface of the at least one light coupler.

19. The method of claim 13, wherein the second light is associated with one or more of an attenuation or absorption of at least a portion of the first light.

20. The method of claim 13, wherein the at least one optical path enables total internal reflection (TIR) for the first light and enables attenuated total internal reflection (ATR) for the second light.

21. The method of claim 13, wherein the at least one optical path enables the second light to travel with the first light to the at least one light coupler.

22. The method of claim 13, wherein the at least one light coupler is adapted to transmit laser as the first light through a sapphire crystal that is adapted to function as the at least one optical path.

23. The method of claim 13, wherein the phases comprise a gas phase, a water phase, and an oil phase, and wherein the optical data comprises variations of intensities in different wavelengths from the first light, the different wavelengths associated with the phases.

24. The method of claim 13, further comprising:
tuning the plurality of tools to select a wavelength of one or more components of the first light, wherein the one or more components include lights of different wavelengths separately or concurrently provided by the at least one light coupler after the tuning.

* * * * *